Fig. 1.

Patented May 12, 1942

2,282,524

UNITED STATES PATENT OFFICE 2,282,524

ELECTRIC MOTOR

Frank G. Logan, Mount Vernon, N. Y., assignor to Ward Leonard Electric Company, a corporation of New York Application August 11, 1939, Serial No. 289,664

13 Claims. (Cl. 172—274)

This invention relates to improvements in electric motors and in the method of controlling the motor adapted to be supplied with energy from an alternating current source and particularly to an improved type and method for obtaining variable speeds over a wide range.

The main object of the invention is to provide a motor which is supplied with energy from an alternating current source and capable of operation over a wide range of speeds efficiently at the different speeds. Another object is to maintain the motor at any selected speed within fairly close limits under changes in load of the motor. Another object is to accomplish these results by the use of controlling means of a simple character which will be dependable and durable under long continued use. Another object is to provide means for changing the speed in which the controlling energy is small compared with the power is controlled thereby. Another object is to avoid large waste of useless energy when operating at the lower speeds. Other objects and advantages of the invention will be understood from the following description and accompanying drawings.

The invention is based upon the utilization of energy in the main, or power windings, of the motor in pulsating or intermittent form and always in the same direction which is affected and controlled by a comparatively small amount of energy. The control energy affects the magnetization of the iron or steel core upon which the power windings are located. This controlling effect is accomplished during the periods when the power windings are inactive, or comparatively inactive, so as to condition or bias the iron in a manner and to a degree to cause certain of the power windings during partial periods of rotation of the motor to become more or less ineffective while other power windings are more or less effective in producing rotation of the motor. As the motor rotates, the power windings are caused to become successively effective and ineffective, or more or less effective and ineffective, depending upon the adjustment of the controlling effect.

The change of speed is accomplished by adjustment of the timing of the control relatively affecting the different portions of the power windings, or by changing the degree to which the iron is biased by the control current, or by changing the field strength of the motor, or by any combination of these methods.

The control of the magnetization of the iron of the power windings during their inactive, or partially inactive periods, may be accomplished in a number of different ways; and it is based upon a controlling effect which is opposing or bucking that produced by the power windings. That is, the power windings when active magnetize the iron in one direction because the pulsations of current in these windings are always in the same direction, whereas the controlling current tends to magnetize the iron in the opposite direction and to condition the iron, when the power windings are inactive, at a lower degree of magnetization or even a reverse magnetization, which must be met by the power windings when they receive current in their intermittent periods. One way of accomplishing the control is to provide an additional winding on the motor which will have an opposite magnetizing effect to the power windings during the periods when the power windings are not receiving current. Another method is to utilize the power windings themselves for transmitting the countermagnetizing current during the intervening periods when they are not subjected to the rectified intermittent currents derived from the alternating current source. This may be accomplished by intermittently applying a voltage to the power windings in such direction as to give the desired magnetizing effect and by generating this voltage by the use of auxiliary apparatus, or by properly controlling the current derived directly from the source.

Fig. 3 is a similar diagram to that of Fig. 2 except instead of generating the control voltage by auxiliary means, as in Fig. 2, the control voltage and current are derived directly from the main source.

Figure 1:
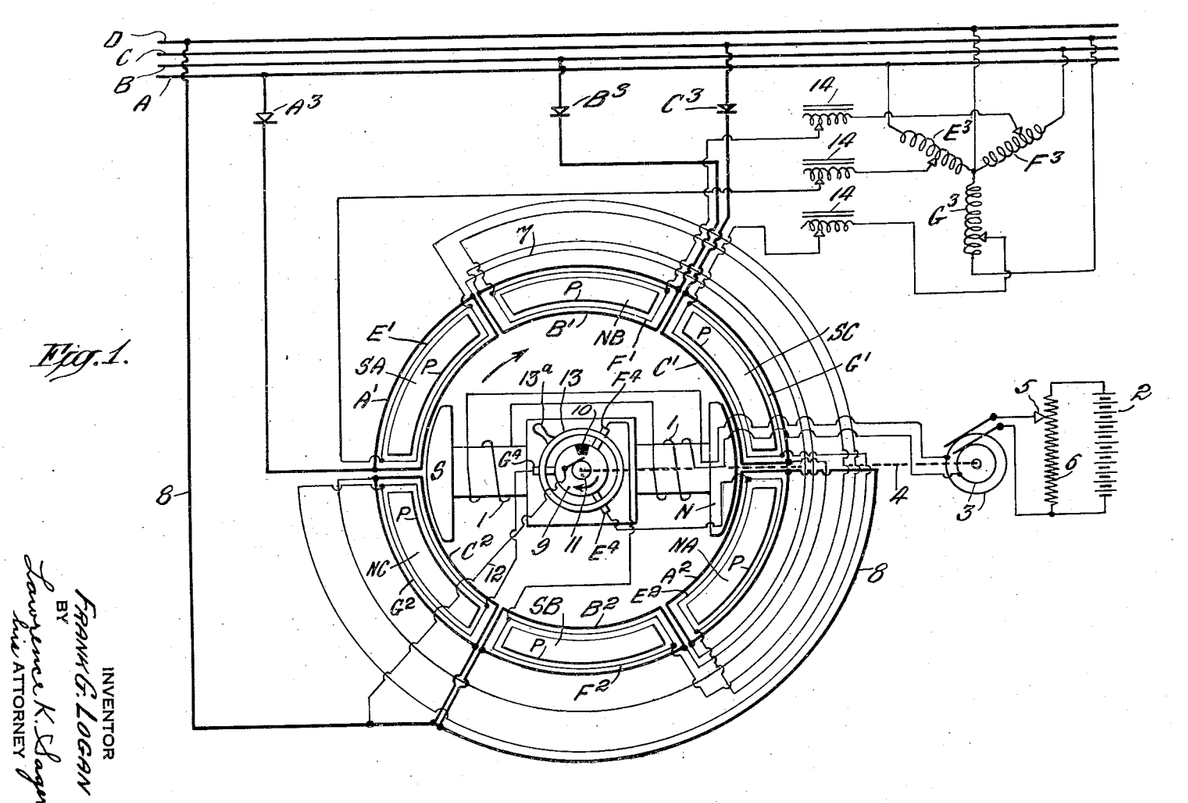
Fig. 1 is a diagram illustrating one form of motor and apparatus embodying the invention wherein an auxiliary control winding is provided on the motor and is illustrated in simplified form for clearness in understanding the mode of operation.

Referring to Fig. 1, the main source of power is indicated by the alternating current supply mains at the top of the figure and in this instance represent a three-phase source having the three-phase lines A, B and C and a neutral line D. The rotor of the motor is the field element shown as having two poles N and S for simplicity of understanding and its windings 1 are excited by direct current derived from any suitable source, a battery 2 being indicated for this purpose. Current is passed to the field windings through slip rings 3 indicated as mounted on the rotor shaft 4 represented by the extended dotted line. One slip ring 3 is connected through its brush to one terminal of the battery and the other ring is shown connected through its brush to an adjustable contact 5 movable along a resistance 6 connected across the battery terminals. This provides means for changing the field strength of the rotor.

The stator is shown provided with three-phase windings and would be built up of laminations in the usual manner and provided with slots for receiving the distributed windings of the different phases; but for simplicity the windings are indicated as concentrated coils and the windings and poles P of the stator are shown in the plane of the paper for convenience, and it will be understood that they face the rotor. Each of the poles is provided with a main or power winding and a control winding. One of the main windings $A^1$ of one phase is indicated by the heavy line enveloping one of the poles P and its corresponding opposite winding $A^2$ of this phase is shown enveloping the opposite pole P. Likewise the windings $B^1$ and $B^2$ represent the power windings of the next phase and the windings $C^1$ and $C^2$ the windings of the third phase, each around their corresponding poles P. The windings $A^1$ and $A^2$ are connected in series with each other across the supply line A and the neutral D through a half-wave rectifier $A^3$, the circuit passing from line A through the rectifier $A^3$ to coil $A^1$, then through this coil to a lead wire 7 to coil $A^2$ which is reversely connected to coil $A^1$ to give opposite polarity, and then by wire 8 to the neutral line D. The windings $B^1$ and $B^2$ of the next phase are similarly connected across the line B and neutral D through a half-wave rectifier $B^3$, and the windings $C^1$ and $C^2$ of the third phase are similarly connected across the line C and neutral D through a half-wave rectifier $C^3$.

These power windings being subjected to current always in one direction from the half-wave rectifiers tend to produce the same direction of flux through the rotor by their intermittent currents, the direction of flux being reversed at successive poles. Let it be assumed that the phase winding $A^1$ produces a south pole, this pole being marked SA. Then the opposite phase winding $A^2$ will produce a north pole being marked NA. Under these assumptions of polarity, the phase winding $B^1$ is connected to produce a north pole and is marked NB, while the phase winding $B^2$ produces a south pole and is marked SB. The phase winding $C^1$ is connected to form a south pole and is marked SC, the phase winding $C^2$ producing a north pole marked NC. That is, the phase windings produce alternate north and south poles around the stator; and each north pole is located diametrically opposite each south pole.

The control windings carry a small current compared to that of the power windings and may be of a much smaller size of wire. They are preferably wound in the same slots and in the same manner as the main windings. Thus the control winding or coil $E^1$ is shown located correspondingly to coil $A^1$ and is shown in light lines within coil $A^1$. It is connected in series with its corresponding opposite coil $E^2$ of the same phase. The control windings $F^1$ and $F^2$ of the next phase and control windings $G^1$ and $G^2$ of the third phase are similarly connected and located in the same relation with reference to their respective power windings of the other two phases.

A three-phase auto transformer is indicated in the upper right hand corner of the figure having windings $E^3$, $F^3$ and $G^3$ connected in star and respectively to the three-phase supply lines; the neutral of the transformer being connected to the neutral supply line D. The adjustable contacts of these windings are connected respectively to the control windings for the purpose of supplying an adjustable voltage to the control windings.

Mounted on the rotor shaft is a device for controlling the supply and non-supply of current to the control windings. This device is made up of conducting and non-conducting segments successively engaged by brushes as the motor rotates. In the drawings the conducting segment is indicated as formed of a metal disk 9 having segment 10 of non-conducting material. The conducting segment is shown as extending over an arc of about 300° while the non-conducting segment covers an arc of about 60°. Electrically connected with the disk is a collector ring 11 engaged by a brush which in turn is connected by conductor 12 to the neutral wire 8. Engaging the outside surfaces of the segments are three brushes $E^4$, $F^4$ and $G^4$ spaced 120° apart and carried by a common brush ring 13 having a handle 13ᵃ for adjusting the ring and brushes to any desired angular position. The control windings $E^1$ and $E^2$ which have one terminal connected to the supply line A through the transformer winding $E^3$ have their remaining terminal connected to the brush $E^4$. Similarly the control windings $F^1$ and $F^2$ have their remaining terminal connected to brush $F^4$ and control windings $G^1$ and $G^2$ have their remaining terminal connected to brush $G^4$. The control windings are subjected to alternating current from the alternating current source when permitted to conduct current and are connected in a manner corresponding to that already described with reference to the main windings. These connections are made to result in the condition that during the half-waves when no current is passing in the main windings, the current passing in their corresponding control windings will tend to magnetize the corresponding poles of the stator in a reverse sense to that of the main windings and lower the magnetization of the iron. The value of the required control current is therefore comparable to that of a magnetizing or exciting current and is much smaller than the load currents of the main windings. The counter magnetizing action by the control windings will be more fully understood by considering the operation in more detail.

First consider the action of the power windings when not affected at all by the control windings. It will be appreciated that when the unidirectional currents and voltage of phase windings $A^1$ and $A^2$ are at a maximum, the south pole SA and north pole NA have their maximum strength giving a strong flux between these poles. Likewise the poles NB and SB attain their maximum values when the control windings are not effective giving a strong flux in the reverse direction between these poles; similarly the poles SC and NC attain their maximum values giving a strong flux between them in the opposite direction. Thus a strong flux is produced across the path of the rotor by each pair of poles which, however, is reversed in direction at each successive phase winding, assuming the absence of all control current.

Now assume that phase windings $A^1$, $A^2$ and $C^1$, $C^2$ are in some manner rendered ineffective while phase windings $B^1$, $B^2$ are alone effective in magnetizing their poles. Then the only effective flux across the rotor path will be from pole NB to pole SB. Next assume that phase windings $C^1$, $C^2$ and $B^1$, $B^2$ are rendered ineffective while windings $A^1$, $A^2$ are alone effective; this causes a flux across the rotor path from pole NA to pole SA. Now if phase windings $B^1$, $B^2$ and $A^1$, $A^2$ are made ineffective then windings $C^1$, $C^2$ only are effective, giving a flux across the rotor path from NC to SC. Then if this sequence of change be repeated, it will result in a rotating magnetic field being produced across the path of the rotor. This field can be utilized to rotate a magnetic element subjected to its influence. It is upon this principle and method of control that this invention is based.

In Fig. 1 the direction of rotation of the rotor is assumed to be clock-wise, as indicated by the arrow. In the position of the parts as shown, the south pole S of the rotor is at the left, midway between windings $A^1$ and $C^2$ while the north pole N is half-way between windings $C^1$ and $A^2$. All the control winding brushes $E^4$, $F^4$ and $G^4$ are shown in contact with conducting segment 9 and the control windings are all effective with the result that all of the main windings are rendered ineffective in producing any appreciable motor flux or torque, provided the control currents are of a sufficient value. It has already been explained that the control windings are located and connected in the same manner as described with reference to the main windings.

If it be assumed that the main windings conduct current from the rectifiers during say the positive half-waves of the alternating current source, the control windings will conduct current similarly during such half-waves in the same direction as the current in the main windings and have an additive effect with the main windings in their magnetizing effect upon the motor. But when the main windings are inactive in conducting current during the negative half-waves, the control windings will conduct current in the opposite direction because no rectifiers are interposed in the control circuits. It follows that the control windings during the negative half-waves pass currents which tend to demagnetize the iron of the stator poles by their opposite or bucking effect and if strong enough may even magnetize them in the reverse direction. When the positive half-wave currents attempt to pass through the main windings they are obliged to overcome the lowered magnetization of the iron due to the iron having been conditioned or biased by the control windings during the negative half-waves. This chokes the passage of the current in the main windings to a greater or lesser degree according to the amplitude of the bucking control currents. It has been found that the effect of even comparatively small control currents are so great as to cause the currents in the main windings to be so much reduced in their intermittent action that the flux created by them may be made so small as not to produce any substantially effective motor flux. It has also been found that the aiding or cumulative acting control currents during the positive half-waves are so small as not to have any relatively large effect in aiding the passage of the currents in the main windings.

It follows from the foregoing considerations that with the position of the control brushes as shown in Fig. 1 with all the control windings effective, no substantial flux is produced by the main windings. If the brush ring 13 now be shifted slightly counterclockwise so that brush $F^4$ rests on the insulating segment 10, the other two brushes would still engage the conducting segment. This condition results in interrupting the current in control windings $F^1$ and $F^2$ permitting the main windings $B^1$ and $B^2$ to have their full effect while the remaining main windings are ineffective. This produces the condition of a strong north pole at the top of the figure and a strong south pole at the bottom of the figure and the poles of the rotor will be attracted towards them, giving rotation in a clockwise direction. But before the rotor reaches a vertical position, the brush $F^4$ will be out of engagement with the segment 10 and make contact with the segment 9, causing the main windings $B^1$ and $B^2$ to become ineffective. The movement of the rotor now causes brush $E^4$ to engage the insulating segment 10 and interrupt the current in the control windings $E^1$ and $E^2$. This permits the main windings $A^1$ and $A^2$ to become effective and produce strong poles NA and SA. The rotor has now attained a position such as to be attracted by these poles and further rotate the motor. After segment 10 has passed from under brush $E^4$ and rendered poles NA and SA ineffective, brush $G^4$ will engage segment 10 and interrupt the current in control windings $G^1$ and $G^2$, rendering poles NC and SC effective. They later become ineffective when brush $G^4$ engages segment 9. Thus the rotation of the motor continues toward the position shown in the drawings. This sequence of control is repeated during each revolution of the rotor.

Instead of using a rotor having magnetized poles as described, the rotor could be of the inductor type, although in that case the torque and efficiency of the motor would be less. Also the rotor could be of other types and also the principles and method of control could be applied to various types and forms of motors for obtaining particular requirements.

In the above described method of operation it was assumed that the control currents were of such value as to render the main windings ineffective when subjected to their bucking effect. In that case the speed of the motor would be at about its maximum. One convenient method of adjusting the speed is by shifting the brushes by the brush ring by handle 13ª. If the brushes be shifted in either direction from the best position for maximum speed, the speed will be decreased. This is because the timing of the action of the control currents is changed and instead of being timed for maximum speed they act so that the main windings are rendered relatively effective and ineffective at time intervals which more or less conflict with each other and produce a combined complex flux action that is less effective as a whole than the condition above described for maximum speed. The more the brushes are shifted from maximum speed position, the less the speed until the motor is brought to a stop. Further shifting of the brushes will cause the rotor to start rotation in the opposite direction and gradually increase to a maximum in the reverse direction. The full range of shifting of the brushes from maximum speed in one direction to maximum speed in the reverse direction is about 120 degrees.

Another method of changing the speed is by changing the amplitude of the control currents. This may be done by changing the voltage applied to the control windings, as by simultaneous adjustment of the contacts of the auto-transformer windings $E^3$, $F^3$ and $G^3$. If these contacts be adjusted from their position to give maximum nullifying effect on the main windings to a position which gives a less nullifying effect by decreasing the current in the control windings, then the main windings so affected are permitted to be more or less active, at the same time that certain of the main windings are rendered fully effective by the interruption of the control current by the insulating segment. The partially active main windings thus introduce a flux which exerts a retarding action on the rotor and reduces its speed the more the control current is reduced.

Another method of changing the speed is by changing the phase of the control currents with reference to the main winding currents. Thus, if the phase of the control currents be such that they have maximum bucking effect when the main windings are not conducting current, then if the phase of control currents be shifted they will have a lesser bucking effect the more they are changed from maximum opposition. This obviously permits the main winding currents to become more effective and create fluxes that will have a retarding effect on the main torque producing flux of the fully active main windings. Fig. 1 shows adjustable inductive devices 14 in series in the circuits of the control windings for changing the phase of the control currents. By shifting their phase sufficiently, they could be caused to even aid the passage of the main currents.

Another way of changing the speed of the motor is by changing the field strength of the rotor, as by adjustment of the contact 5 to change the current supplied to the rotor field windings. Decrease of this current and thereby weakening the field strength causes the motor speed to increase, and increasing the field strength causes the motor speed to decrease, for reasons similar to those applying to change of field strength of a direct current motor.

It will be understood that any one or more of the above described methods of controlling the motor speed may be used either separately or in any combination of them, as may be desirable for the particular design or use of the motor.

Figure 2:
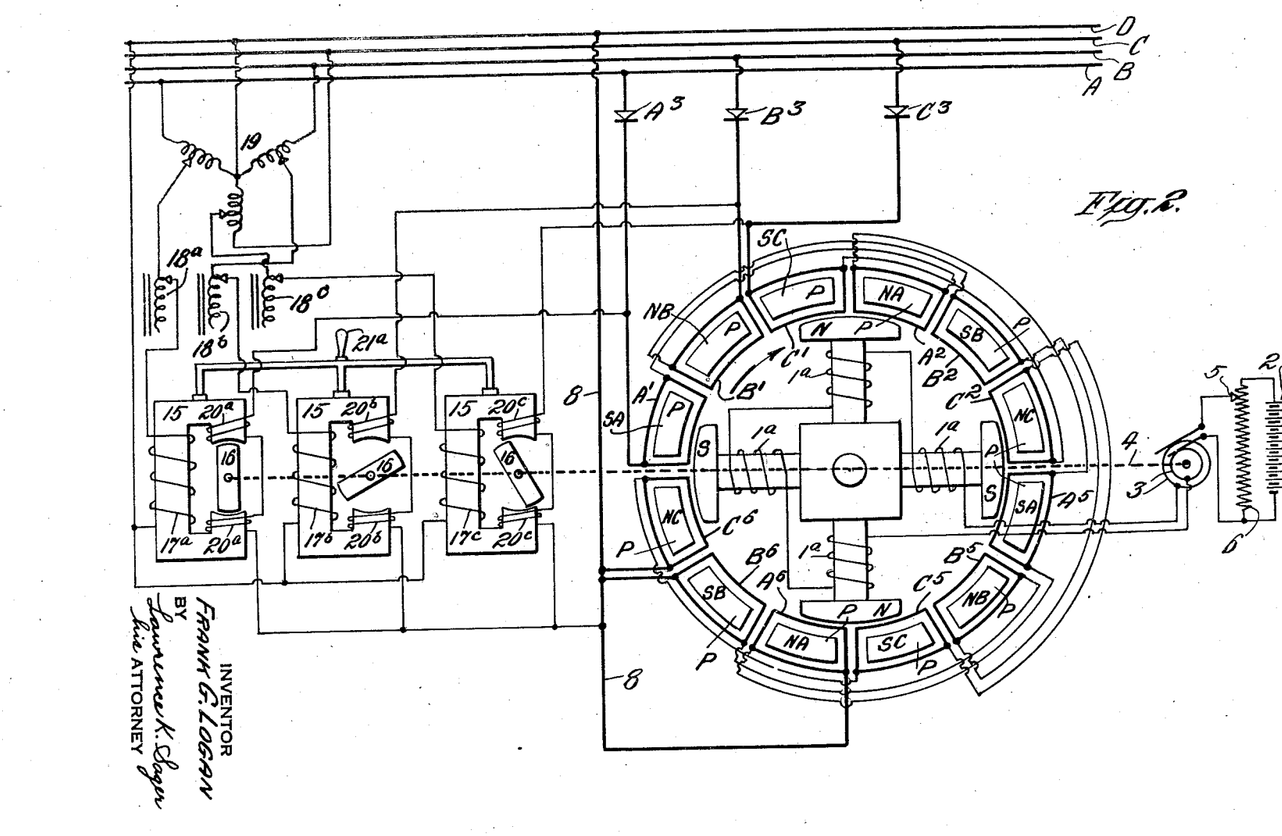
Fig. 2 is a similar diagram wherein the main windings of the motor also serve to transmit the controlling current.
Figure 5:
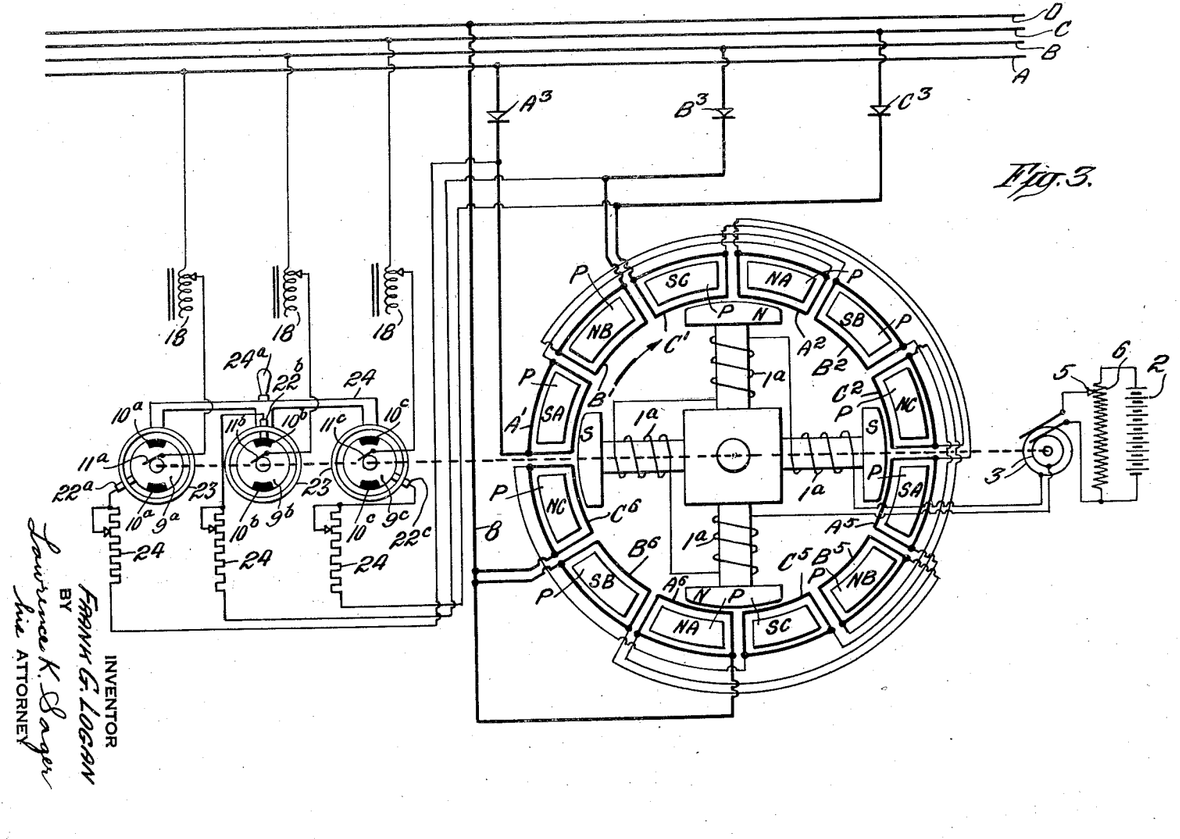

In Fig. 2 the control currents are supplied to the main windings of the motor instead of to an auxiliary winding. Fig. 2 shows a four pole motor instead of a two pole motor and corresponding parts are designated by the same characters as in Fig. 1. The rotor having two north poles and two south poles as marked, is shown having a field winding $1^a$ supplied with direct current. The main windings of phase A are indicated as $A^1$, $A^2$, $A^5$ and $A^6$, those of phase B as $B^1$, $B^2$, $B^5$ and $B^6$, and those of phase C as $C^1$, $C^2$, $C^5$ and $C^6$. These windings are connected so as to produce alternate north and south poles around the stator as they become successively active, the pole of phase winding $A^1$ being designated as SA, that of phase winding $B^1$ as NB, that of phase winding $C^1$ as SC, that of phase winding $A^2$ as NA and so on.

At the left of Fig. 1 is indicated a three-phase rotary transformer having three stators 15 and three rotary inductors 16 respectively, each of which are shown mounted upon the shaft of the motor. These rotary inductors are displaced on the shaft at an angle of 60° from each other, as shown. Primary windings $17^a$, $17^b$ and $17^c$ of the three portions of the rotary transformers are respectively connected through adjustable inductances $18^a$, $18^b$ and $18^c$ and through a three-phase auto-transformer 19 shown connected in star and having its windings respectively connected to the supply lines A, B and C and its neutral point connected to the neutral line D.

The secondary windings $20^a$, $20^b$ and $20^c$ of the three portions of the rotary transformers have their common terminals connected to the neutral line 8 while the remaining terminal of the secondary winding $20^a$ is connected to the phase winding $A^1$, the remaining terminal of the secondary $20^b$ is connected to the phase winding $B^1$ and the remaining terminal of the secondary winding $20^c$ is connected to the phase winding $C^1$. The control currents are thereby supplied from the secondary windings of the three-phase transformer to and through all of the phase windings of the motor and find their return path to the neutral line 8. When the rotary inductors of the three-phase transformer are in such position with reference to the stator poles respectively as to permit the passage of the magnetic flux from one pole to the opposite pole of each portion of the rotary transformer, an alternating controlling current will be induced in the respective secondary windings; but when the inductors are not opposite the poles of the respective portions of the rotary transformer, no appreciable voltage or current is induced in the secondary windings. The timing of the action of the controlling currents may be adjusted by angularly shifting the stator portions of the rotary transformer; and for this purpose the three stator portions are indicated as having a common cross-bar 21 connecting them together which in turn is provided with a handle $21^a$. It will thus be seen that the timing of the passage of the respective controlling currents may be simultaneously adjusted by moving the handle $21^a$.

The effect of the control currents on the main windings of the motor may be understood by first considering the effect upon the windings of one phase. Considering the winding of phase A, these are all simultaneously affected whenever current is supplied from the secondary winding $20^a$ and are more or less choked during the passage of this control current. The choking effect is greatest when the control current passes through the main windings of phase A during the alternate half-wave periods when the windings of phase A are inactive in conducting the main current and when the control currents pass through the main windings in the reverse direction during such half-wave periods from the direction in which the main currents pass through the main windings during their active half-wave periods. In other words, the control currents are most effective in their choking effect upon the main windings when they pass through the main windings during their non-active periods in a reverse direction to that of the main currents when they are active.

In considering the action of the motor, the position of the rotor as shown will first be explained. A south pole of the rotor is shown extending to the left and about half-way between phase windings $A^1$ and $C^6$. At this time the control currents in these phase windings should be active so as to choke the currents in these main windings; but this south pole is approaching the phase winding $B^1$ and this winding which produces a north pole NB should be fully active in order to attract the south pole of the rotor. Therefore the control current in phase winding $B^1$ and the other windings of this phase should be substantially non-existent so as to permit the phase windings $B^1$ to $B^6$ to have the full effect of the main current through them. In examining the position of the inductor 16 controlling the current in the secondary winding 20ᵇ, it will be seen that this inductor is moving away from its poles so as to reduce the control current of winding 20ᵇ to a minimum. As this control current is the one which affects the main phase windings B¹ to B⁶, it will be seen that the north poles NB of this phase winding are beginning to have their full effect in attracting the south poles of the rotor and the south poles SB are beginning to have their full effect in attracting the north poles of the rotor. At this time the currents in the main phase windings A¹ to A⁶ and C¹ to C⁶ should be rendered in effective which means that the control currents passed through these windings should be active in their choking effect on the currents of these main windings. It will be seen that the inductor 16 of the left-hand portion of the rotary transformer is in a position to permit the secondary winding 20ᵃ to supply current to the phase windings A¹ to A⁶ and likewise the inductor of the right-hand portion of the transformer is in a position to permit the secondary winding 20ᶜ to supply current to the main windings C¹ to C⁶ and thereby choke their main current. Thus the poles of the rotor are free to be attracted by the poles of phase windings B¹ to B⁶. After the rotor has turned to a position where the left-hand south pole is between the phase windings B¹ and C¹, the position of the inductors of the rotary transformer will be such that the phase windings B¹ to B⁶ will be rendered ineffective and the phase windings C¹ to C⁶ will be rendered ineffective, while the inductor corresponding to the secondary winding 20ᵃ will be in a position such that no appreciable current is supplied to the phase windings A¹ to A⁶ and thereby permit the poles NA and SA to attract the approaching poles of the rotor. Similarly, the rotation of the rotor will cause the phase windings C¹ to C⁶ to become effective while the other windings are rendered ineffective by the positions of the inductors of the rotary transformer; and this sequence of changes continues as the rotor moves in its continuous rotation.

The speed of the motor may be changed by angularly adjusting the three stator portions of the rotary transformer by the handle 21ᵃ which changes the timing of the application of the control currents to the main windings and the timing of their inaction, this action being similar to the results obtained by adjusting the brush ring 13 of Fig. 1. The speed may be changed also by adjustment of the contacts of the three-phase auto-transformer 19 which changes the value of the control currents; and the speed may be changed by changing the phase of the control currents as by adjustment of the contacts of the inductances 18ᵃ, 18ᵇ and 18ᶜ. Also the speed may be changed by changing the current in the field windings 1ᵃ of the rotor.

Fig. 3 is similar to Fig. 2 except that the control currents are derived directly from the supply mains, similar parts being designated by corresponding reference characters. At the left of Fig. 3 is indicated a series of three current controlling devices mounted on the shaft of the motor. Each of these comprises a conducting disk 9ᵃ, 9ᵇ and 9ᶜ having a pair of insulating segments 10ᵃ, 10ᵇ and 10ᶜ respectively at their peripheries. Each of the disks has a collector ring engaged respectively by brushes 11ᵃ, 11ᵇ and 11ᶜ. These brushes are connected through adjustable inductances 18 to the supply lines A, B and C respectively. The peripheries of the conducting disks are engaged respectively by brushes 22ᵃ, 22ᵇ and 22ᶜ which are angularly displaced 120° from each other. They are carried by brush rings 23 which are connected to a common element 24 having a handle 24ᵃ for simultaneously adjusting the position of the brushes angularly. The brush 22ᵃ is connected to the phase winding A¹ for supplying a control current to the phase windings A¹ to A⁶, the return path being to the neutral line D by the conductor 8. The brush 22ᵇ is similarly connected to the phase windings B¹ to B⁶ and the brush 22ᶜ is connected to the phase windings C¹ to C⁶. In series with these connections from the brushes are adjustable non-inductive resistances 24.

The operation is similar to that described with reference to Fig. 2 and it will be seen from the position of the parts shown in Fig. 3 that the brush 22ᵇ is in contact with an insulating segment 10ᵇ and consequently no control current is supplied to the phase windings B¹ to B⁶. Thus the poles of the rotor will be attracted by the poles NB and SB of the stator. After a certain movement the brush 22ᵃ will engage an insulating segment while brushes 22ᵇ and 22ᶜ are in contact with their conducting disks. This will result in no control current being supplied to the phase windings A¹ to A⁶ causing further attraction of the poles of the rotor. Further rotation results in the brush 22ᶜ engaging an insulating segment 10ᶜ while the brushes 22ᵃ and 22ᵇ are engaging their respective conducting disks. This causes the phase windings C¹ to C⁶ to be permitted to have their full effectiveness, causing further rotation of the rotor. This sequence of operation continues resulting in certain phase windings having their full effect successively while other phase windings are rendered more or less ineffective.

In Fig. 3 the speed of the motor may be changed by angularly adjusting the brush rings 23 by means of the handle 24ᵃ which changes the timing of the action of the control currents with reference to the currents in the main phase windings of the motor. The speed may also be changed by adjustment of the contacts of resistances 24 which changes the value of the counter-acting control currents; and the speed may also be changed by changing the phase of these control currents, as by adjustment of the contacts of the inductances 18. In this figure, like in the other figures the speed may be adjusted by changing the current in the field windings of the motor.

It will be understood that the foregoing description and accompanying drawings are directed to the basic features and method of operation of this improvement and that in actual practice the particular design of the motor and controlling apparatus will be such as to conform to the established principles of design. For example, instead of using concentrated main phase windings, the motor may be provided with slots in which distributed and overlapping motor windings would be used and the auxiliary control windings when utilized would be correspondingly wound. Also, instead of applying the phase windings to the stator, they may be carried on the rotor of the motor while the stator will be provided with the direct current windings for producing fixed field poles. Also, instead of using a three-phase supply, any other polyphase source or split-phase source may be utilized and the motor designed to adapt itself thereto. Likewise any form of rectifiers may be used for producing uni-directional pulsating or intermittent currents in the main windings of the motor and it may be noted that one important advantage of this invention is that there is no appreciable inverse peak voltage to which the rectifiers are subjected, thereby greatly prolonging their life and avoiding the necessity of their renewal after short periods of use. It will be understood that various modifications and adaptations of the invention may be made without departing from the scope thereof.

I claim:

1. The combination of a source of alternating current, an electric motor comprising a rotary element and a stationary element, one of said elements having main windings, means for supplying rectified intermittent currents from said source to said windings, and means for reducing the current in certain of said windings in relation to the current in other of said windings successively in accordance with the speed of the motor, said last named means comprising a device for supplying auxiliary control currents to said main windings.

2. The combination of a source of alternating current, an electric motor comprising a rotary element and a stationary element, one of said elements having main windings, means for supplying rectified intermittent currents from said source to said windings, and means for reducing the current in certain of said windings in relation to the current in other of said windings successively in accordance with the speed of the motor, said last named means comprising a device for supplying auxiliary control currents to certain of said main windings during the periods when said main windings are not conducting said rectified currents.

3. The combination of a source of alternating current, an electric motor comprising a rotary element and a stationary element, one of said elements having main windings, means for supplying rectified intermittent currents from said source to said windings, and means for reducing the current in certain of said windings in relation to the current in other of said windings successively in accordance with the speed of the motor, said last named means comprising a device for supplying auxiliary control currents to certain of said main windings during the periods when said main windings are not conducting said rectified currents and in a direction opposite to that of said rectified currents.

4. The combination of a source of alternating current, an electric motor comprising a rotary element and a stationary element, one of said elements having windings, means for supplying rectified intermittent currents from said source to at least a portion of said windings, and means for supplying an auxiliary control current to at least a portion of said windings to affect said last named element for reducing the flux of certain of said windings subjected to said rectified currents in relation to the flux of other of said last named windings successively in accordance with the speed of the motor.

5. The combination of a source of alternating current, an electric motor comprising a rotary element and a stationary element, one of said elements having windings, means for supplying rectified intermittent currents from said source to at least a portion of said windings, and means for supplying an auxiliary control current to at least a portion of said windings to affect said last named element for reducing the flux of certain of said windings subjected to said rectified currents in relation to a flux of other of said last-named windings successively, said last named means comprising a device driven by said rotary element.

6. The combination of a source of alternating current, an electric motor comprising a rotary element and a stationary element, one of said elements having main windings and auxiliary windings, means for supplying rectified intermittent currents from said source to said main windings, and means for supplying an auxiliary control current to said auxiliary windings to affect said last named element for reducing the flux of certain of said main windings in relation to the flux of other of said main windings successively in accordance with the speed of the motor.

7. The combination of a source of alternating current, an electric motor comprising a rotary element and a stationary element, one of said elements having windings, means for supplying rectified intermittent currents from said source to at least a portion of said windings for producing magnetic poles, and means for supplying an auxiliary control current to at least a portion of said windings for biasing the poles of certain of said windings subjected to said rectified currents magnetically and successively in opposition to the magnetization of said poles by said last named windings during the periods when said last named windings are not conducting said rectified currents.

8. The combination of a source of alternating current, an electric motor comprising a rotary element and a stationary element, one of said elements having windings, means for supplying rectified intermittent currents from said source to at least a portion of said windings for producing magnetic poles, and means for supplying an auxiliary control current to at least a portion of said windings for biasing the poles of certain of said windings subjected to said rectified currents magnetically and successively in opposition to the magnetization of said poles by said last named windings during the periods when said last named windings are not conducting said rectified currents and in accordance with the speed of the motor.

9. An electric motor comprising main polyphase windings, means for supplying intermittent direct currents to the different groups of said phase windings at spaced time intervals respectively for producing magnetic poles, auxiliary windings on said motor in distributed relation to said main windings respectively, and means for supplying control currents to said auxiliary windings for biasing the poles of said main windings magnetically and successively in opposition to the magnetization of said poles by the main windings during the periods when said main windings are not conducting said intermittent currents.

10. An electric motor comprising polyphase windings, means for supplying intermittent direct currents to at least a portion of said phase windings at spaced time intervals respectively for producing magnetic poles, and means for supplying control currents to at least a portion of said phase windings for biasing the poles of certain of said windings subjected to said intermittent currents magnetically and successively in opposition to the magnetization of said poles by said last named windings during the periods when said last named windings are not conducting said intermittent currents.

11. An electric motor comprising polyphase windings, means for supplying intermittent direct currents to at least a portion of said phase windings at spaced time intervals respectively for producing magnetic poles, means for supplying control currents to at least a portion of said phase windings for biasing the poles of certain of said windings subjected to said intermittent currents magnetically and successively in opposition to the magnetization of said poles by said last last named windings are not conducting said intermittent currents, and means for changing said biasing for changing the speed of the motor.

12. The combination with a source of polyphase alternating current of an electric motor comprising polyphase windings, rectifying means connected to said source for supplying intermittent direct currents to at least a portion of said phase windings at spaced time intervals respectively for producing magnetic poles, and means for supplying to at least a portion of said phase windings control currents derived from said source and at similar spaced time intervals for biasing the poles of certain of said windings subjected to said intermittent currents magnetically and successively in opposition to the magnetization of said poles by said last named windings during the periods when said last named windings are not conducting said intermittent currents.

13. The combination with a source of polyphase alternating current of an electric motor comprising polyphase windings, rectifying means connected to said source for supplying intermittent direct currents to at least a portion of said phase windings at spaced time intervals respectively for producing magnetic poles, and means for supplying to at least a portion of said phase windings alternating control currents derived from said source and at similar spaced time intervals for biasing the poles of certain of said windings subjected to said intermittent currents magnetically and successively in opposition to the magnetization of said poles by said last named windings during the periods when said last named windings are not conducting said intermittent currents.

FRANK G. LOGAN.

CERTIFICATE OF CORRECTION.

Patent No. 2,282,524.　　　　　　　　　　　　　　　May 12, 1942.

FRANK G. LOGAN.

It is hereby certified that error appears in the printed specification of the above numbered patent requiring correction as follows: Page 1, first column, line 19, after "power" insert --which--; page 6, first column, line 59, claim 4, for "least a portion of said windings to affect said last" read --element and a stationary element, one of said--; page 7, first column, line 15, claim 11, strike out "last"; and that the said Letters Patent should be read with this correction therein that the same may conform to the record of the case in the Patent Office.

Signed and sealed this 23rd day of June, A. D. 1942.

(Seal)　　　　　　　　　　　　　　　　　　　　　　Henry Van Arsdale,
　　　　　　　　　　　　　　　　　　　　　　　Acting Commissioner of Patents.